(12) United States Patent
Ding

(10) Patent No.: US 7,974,192 B2
(45) Date of Patent: Jul. 5, 2011

(54) MULTICAST SWITCHING IN A DISTRIBUTED COMMUNICATION SYSTEM

(75) Inventor: Da-Hai Ding, Lexington, MA (US)

(73) Assignee: Avaya Inc., Basking Ridge, NJ (US)

( * ) Notice: Subject to any disclaimer, the term of this patent is extended or adjusted under 35 U.S.C. 154(b) by 1059 days.

(21) Appl. No.: 11/274,514

(22) Filed: Feb. 2, 2004

(65) Prior Publication Data

US 2006/0146823 A1    Jul. 6, 2006

Related U.S. Application Data

(63) Continuation of application No. 09/418,161, filed on Oct. 13, 1999.

(51) Int. Cl.
*G01R 31/08* (2006.01)
*H04L 12/28* (2006.01)
*H04J 3/16* (2006.01)
*H04J 3/24* (2006.01)

(52) U.S. Cl. ........ 370/230; 370/235; 370/390; 370/392; 370/401; 370/467; 370/469; 370/473

(58) Field of Classification Search .................. 370/390, 370/392, 432
See application file for complete search history.

(56) References Cited

U.S. PATENT DOCUMENTS

| | | | | |
|---|---|---|---|---|
| 5,926,463 A * | 7/1999 | Ahearn et al. | ................. | 370/254 |
| 6,097,720 A * | 8/2000 | Araujo et al. | ................. | 370/355 |
| 6,181,681 B1 | 1/2001 | Hiscock et al. | | |
| 6,188,691 B1 * | 2/2001 | Barkai et al. | ................. | 370/390 |
| 6,411,616 B1 | 6/2002 | Donahue et al. | | |
| 6,424,659 B2 | 7/2002 | Viswanadham et al. | | |
| 6,457,059 B1 | 9/2002 | Kobayashi | | |
| 6,483,832 B1 | 11/2002 | Civanlar et al. | | |

OTHER PUBLICATIONS

Deering, S., Internet Engineering Task Force (IETF) Request for Comments (RFC) 1112, Host Extensions for IP Multicasting, Aug. 1989.
Fenner, W., Internet Engineering Task Force (IETF) Request for Comments (RFC) 2236, Internet Group Management Protocol Version 2, Nov. 1997.
Office Action mailed Dec. 3, 2002 as issued in U.S. Appl. No. 09/418,161, filed Oct. 13, 1999.

* cited by examiner

*Primary Examiner* — Seema S Rao
*Assistant Examiner* — Christine Duong

(57) ABSTRACT

A technique for multicast switching in a distributed communication system having a plurality of cooperating modules enables a module to forward multicast packets associated with a multicast stream without using a centralized module or control logic by determining all network interfaces and remote modules associated with the multicast stream and forwarding multicast packets to only those network interfaces and remote modules associated with the multicast stream. IGMP snooping may be used to determine the network interfaces and remote modules associated with the multicast stream, and may also be used to determine host addresses, router addresses, and an IGMP version for each network interface and for each remote module. In order to generate IGMP messages, the module learns a multicast device address from received IGMP messages and uses the multicast device address to send the IGMP messages. The module decides whether to send IGMP version 1 messages or IGMP version 2 messages on a particular interface based upon the IGMP version of IGMP messages received over the interface.

12 Claims, 17 Drawing Sheets

Last Host Address — 702

Last Router Address — 704

Host Interface List — 706

Router Interface List — 708

IGMP Version List — 710

MULTICAST SWITCHING IN A DISTRIBUTED COMMUNICATION SYSTEM

CROSS-REFERENCE TO RELATED APPLICATIONS

This application is a continuation of prior application U.S. Ser. No. 09/418,161 filed on Oct. 13, 1999 which is hereby incorporated by reference.

FIELD OF THE INVENTION

The present invention relates generally to communication systems, and more particularly to multicast switching in a distributed communication system.

BACKGROUND OF THE INVENTION

In today's information age, it is typical for computers and computer peripherals to be internetworked over a communication network. The communication network typically includes a plurality of communication links that are interconnected through a number of intermediate devices, such as bridges, routers, or switches. Information sent by a source device to a destination device traverses one or more communication links.

The various communication devices in the communication network, including the computers, computer peripherals, and intermediate devices, utilize various communication protocols in order to transport the information from the source device to the destination device. The communication protocols are typically implemented in layers, which together form a protocol stack. Each protocol layer provides a specific set of services to the protocol layer immediately above it in the protocol stack. Although there are different protocol layering schemes in use today, the different protocol layering schemes have certain common attributes. Specifically, protocols at the lowest layer in the protocol stack, which are typically referred to as the "layer 1" or "physical layer" protocols, define the physical and electrical characteristics for transporting the information from one communication device to another communication device across a single communication link. Protocols at the next layer in the protocol stack, which are typically referred to as the "layer 2" or "Medium Access Control (MAC) layer" protocols, define the protocol message formats for transporting the information across the single communication link by the physical layer protocols. Protocols at the next layer in the protocol stack, which are typically referred to as the "layer 3" or "network layer" protocols, define the protocol message formats for transporting the information end-to-end from the source device to the destination device across multiple communication links. Higher layer protocols ultimately utilize the services provided by the network protocols for transferring information across the communication network.

Each intermediate device supports multiple communication links, and forwards protocol messages between communication links. Some intermediate devices forward protocol messages based upon layer 2 addresses, while other intermediate devices forward protocol messages based upon layer 3 addresses. An intermediate device that forwards protocol messages based upon layer 2 addresses is often referred to as a bridge or switch, while an intermediate device that forwards protocol messages based upon layer 3 addresses is often referred to as a router.

One common networking application, referred to as "multicasting," allows an information provider (referred to hereinafter as a "multicast source") to transmit a single unit of multicast information (referred to hereinafter as a "multicast packet") simultaneously to a group of information consumers (referred to hereinafter as the "multicast group"), specifically by addressing the multicast packet to the multicast group using a multicast address. The multicast group members monitor the communication network for multicast packets addressed to the multicast group.

In a communication network that supports Internet Protocol (IP) multicasting, multicasting is supported at layer 3 of the protocol stack. The multicast address is a layer 3 address, and the various routers in the communication network forward multicast packets using the layer 3 address according to a multicast routing protocol.

When a layer 2 device needs to forward a multicast packet, the layer 2 device may treat the multicast packet as a broadcast, in which case the layer 2 device forwards the multicast packet to all communication links that it supports (other than the communication link over which the multicast packet was received). Such broadcasting of the multicast packet may generate unnecessary network traffic, particularly when multicast streams are not supported by all communication links. Therefore, the layer 2 device preferably determines which communication links support multicast streams, and selectively forwards the multicast packet only to those communication links that support multicast streams. Such selective forwarding of the multicast packet avoids unnecessary network traffic.

One way for the layer 2 device to determine which communication links support multicast streams is by monitoring Internet Group Management Protocol (IGMP) messages received from each of the communication links. IGMP is a protocol that is used by multicast devices to control membership in multicast groups. Using IGMP, a multicast device can join a multicast group or leave a multicast group. IGMP messages are layer 3 protocol messages that identify multicast devices (i.e., hosts and routers) on the communication link. Even though the IGMP messages are layer 3 messages, the layer 2 device is able to receive and process the IGMP messages in order to determine whether or not there are any active multicast devices on a particular communication link. Such monitoring of IGMP messages is referred to hereinafter as IGMP "snooping."

To further reduce unnecessary network traffic, the layer 2 device may forward a single IGMP report on behalf of all connected multicast hosts for a particular multicast group and suppress any additional IGMP reports for the same multicast group. When a multicast device generates an IGMP query for the multicast group, the layer 2 device may receive IGMP reports from all connected multicast hosts. Since only one IGMP report is needed to indicate that the multicast group is active (i.e., that the multicast group has at least one member), the layer 2 device forwards only one of the IGMP reports and suppresses the other IGMP reports. Such forwarding and suppressing of IGMP reports is referred to hereinafter as IGMP "proxy."

Because layer 2 devices are utilized in a wide range of applications, some layer 2 devices utilize a modular design that enables a number of modules to be interconnected in a stack configuration such that the number of interconnected modules interoperate in a cooperating mode of operation to form a single virtual device. Each module is capable of operating independently as a stand-alone device or in a stand-alone mode of operation, and therefore each module, is a complete system unto itself. Each module typically includes a number of network interfaces for supporting directly connected communication links as well as an inter-module communication interface for interfacing with the other modules in the stack.

The modular design approach enables the layer 2 device to be scalable, such that modules can be added and removed to fit the requirements of a particular application. However, the modular design approach also complicates IGMP snooping and IGMP proxy functions. Specifically, when a number of modules are interconnected in a cooperating mode of operation, it is possible for multicast group members on different communication links to be supported by different modules of the layer 2 device.

SUMMARY OF THE INVENTION

In accordance with one aspect of the invention, multicast switching is supported in a distributed (modular) communication system having a plurality of cooperating modules by having each module forward multicast packets to all remote modules that are associated with a particular multicast stream. No centralized module or logic is required. The same logic is used in a particular module whether the module is operating in a cooperating mode of operation or in a stand-alone mode of operation. A multicast stream can be associated with a particular multicast group or with a particular multicast group on a particular Virtual LAN (VLAN). Each module determines the network interfaces and the remote modules that are associated with a particular multicast stream. When the module receives a multicast packet from a network interface, the module forwards the multicast packet to all network interfaces that are associated with the multicast stream other than the network interface over which the multicast packet was received, and also forwards the multicast packet to all remote modules that are associated with the multicast stream. When the module receives a multicast packet from a remote module, the module forwards the multicast packet to all network interfaces that are associated with the multicast stream.

In accordance with another aspect of the invention, the modules use IGMP snooping to determine the network interfaces and remote modules that are associated with each multicast stream. A module determines that a network interface is associated with a multicast stream upon receiving an IGMP message over the network interface. A module determines that a remote module is associated with a multicast stream upon receiving an IGMP message from the remote module. Therefore, when a module receives an IGMP message over a network interface, the module forwards the IGMP message to all remote modules, among other things.

In accordance with another aspect of the invention, each module maintains a forwarding interface list for each multicast stream. The forwarding interface list is preferably a bit-mapped field with one bit per network interface and one bit per remote module. The forwarding interface list indicates all network interfaces and all remote modules that are associated with the corresponding multicast stream. The forwarding interface list is preferably programmed into a CAM device that is used for switching packets.

In accordance with another aspect of the invention, an intermediate device sends IGMP messages using a multicast device address that is learned from a received IGMP message. An IGMP report message is sent using a multicast host address. An IGMP query message is sent using a multicast router address.

In acordance with another aspect of the invention, an intermediate device sends IGMP messages over an interface, and formats the IGMP messages as either IGMP version 1 messages or IGMP version 2 messages according to the IGMP version of IGMP messages received over the interface. The intermediate device sends IGMP version 1 messages over the interface if at least one IGMP version 1 message was received over the interface. The intermediate device sends IGMP version 2 messages over the interface if and only if all IGMP messages received over the interface are IGMP version 2 messages.

BRIEF DESCRIPTION OF THE DRAWINGS

The foregoing and other objects and advantages of the invention will be appreciated more fully from the following further description thereof with reference to the accompanying drawings wherein:

FIG. 7 shows the relevant information that a module maintains for each multicast stream in accordance with an embodiment of the present invention;

DETAILED DESCRIPTION OF A PREFERRED EMBODIMENT

An embodiment of the present invention supports multicast switching in a distributed (modular) communication system without requiring a dedicated management module. The distributed (modular) communication system includes multiple interconnected modules. Each module includes a number of network interfaces and an inter-module communication interface. Each network interface is coupled to a Local Area Network (LAN), and is preferably capable of supporting multiple Virtual LANs (VLANs) over the LAN. The inter-module communication interface enables the module to communicate with the other modules. Each module has a logical connection to each of the other cooperating modules over the inter-module communication interface.

Figure 1:
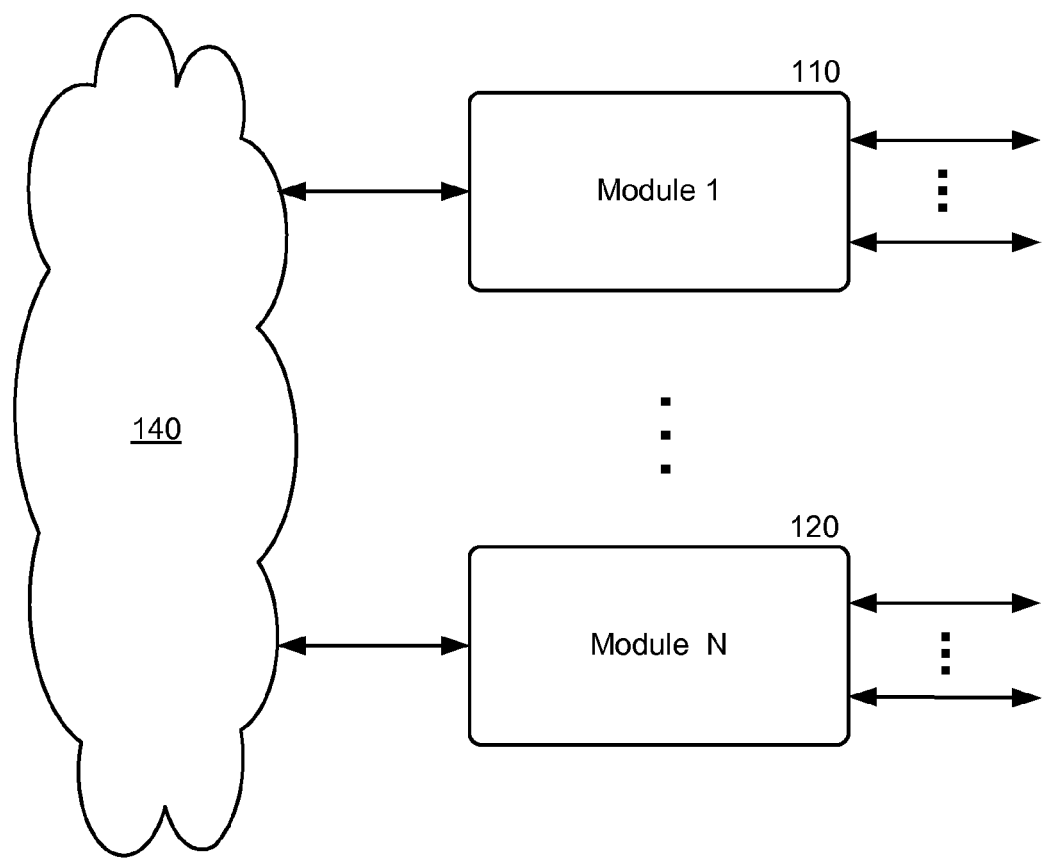
FIG. 1 is a block diagram showing an exemplary modular Ethernet switch in accordance with a preferred embodiment of the present invention.

FIG. 1 is a block diagram showing an exemplary distributed (modular) communication system 100 in accordance with an embodiment of the present invention. The distributed (modular) communication system 100 includes a number of modules (110, 120) that are interconnected over a communication medium 140, such as a bus, backplane, or other signaling medium. For convenience, the distributed (modular) communication system 100 is referred to hereinafter as a stack.

Figure 2:
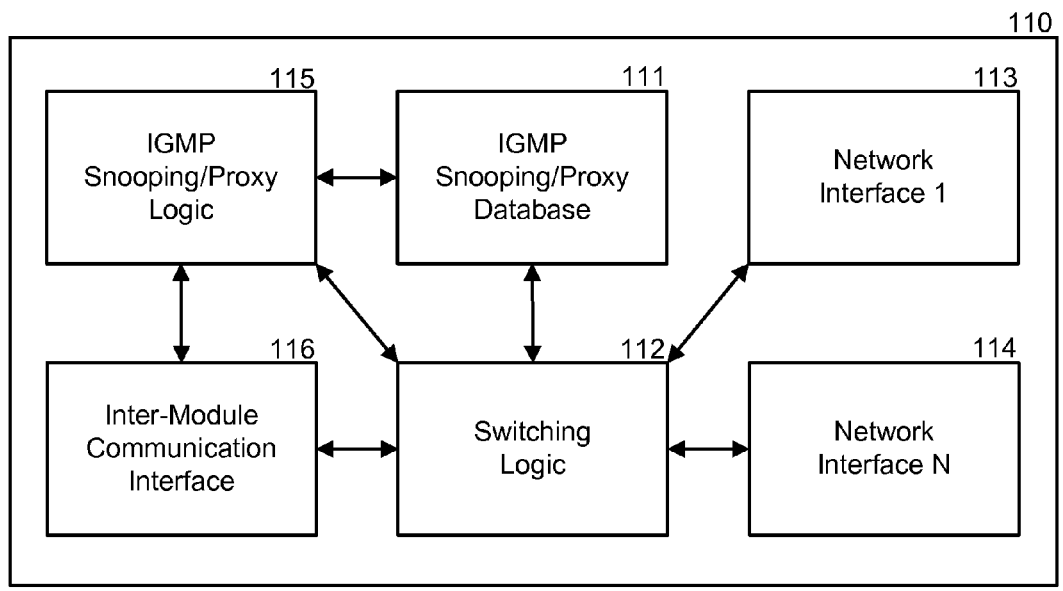
FIG. 2 is a block diagram showing the relevant logic blocks of an exemplary module in accordance with an embodiment of the present invention.

FIG. 2 is a block diagram showing the relevant logic blocks of an exemplary module 110 in accordance with an embodiment of the present invention. The module 110 includes, among other things, a number of network interfaces (113, 114), an inter-module communication interface (116), switching logic (112), IGMP snooping/proxy logic (115), and an IGMP snooping/proxy database (111).

In a preferred embodiment of the invention, the stack 100 is a modular Ethernet switch including a number of interconnected Ethernet switching modules. The preferred Ethernet switching module can be configured to operate as an independent stand-alone device, or alternatively up to eight (8) Ethernet switching modules can be interconnected in a stack configuration, preferably by interconnecting the up to eight (8) Ethernet switching modules through a dual ring bus having a bandwidth of 2.5 gigabits per second. Within the stack configuration, a particular Ethernet switching module can be configured to operate in either a stand-alone mode, in which the particular Ethernet switching module performs Ethernet switching independently of the other Ethernet switching modules in the stack, or a cooperating mode, in which the particular Ethernet switching module performs Ethernet switching in conjunction with other cooperating Ethernet switching modules. Furthermore, a particular Ethernet switching module in the stack can be dynamically reconfigured between the stand-alone mode and the cooperating mode without performing a system reset or power cycle of the particular Ethernet switching module, and Ethernet switching modules can be dynamically added to the stack and removed from the stack without performing a system reset or power cycle of the other Ethernet switching modules in the stack.

In a preferred embodiment, each network interface (113, 114) is attached to an Ethernet Local Area Network (LAN) on which there are a number of directly connected communication devices (not shown in FIG. 1). Each network interface (113, 114) may be configured to support virtual LANs (VLANs) over the Ethernet LAN. Thus, each directly connected communication device is associated with a particular network interface on a particular Ethernet switching module, and, if VLAN is supported, with a particular VLAN associated with the network interface.

In a preferred embodiment, the inter-module communication interface (116) is coupled to the dual ring bus 140, and enables the corresponding Ethernet switching module to communicate with the other Ethernet switching modules in the stack 100. The inter-module communication interface (116) enables the module 110 to send and receive information (including management information, control information, and data) over the dual-ring bus 140. The inter-module communication interface (116) provides for both reliable (acknowledged) and unreliable transfers over the dual-ring bus 140, and allows information to be directed to a particular remote module or group of remote modules. For convenience, a virtual connection from the module 110 to a remote module over the inter-module communication interface (116) is referred to hereinafter as a "stack port." The module 110 includes a stack port for each remote module.

The IGMP snooping/proxy logic (115) performs the IGMP snooping and IGMP proxy functions. The IGMP snooping/proxy logic (115) includes, among other things, logic for determining the last host address for each multicast stream, logic for determining the last router address for each multicast stream, logic for determining the interfaces associated with each multicast stream, logic for determining the IGMP version for each interface, and logic for consolidating multiple IGMP reports into a single IGMP report as part of the IGMP proxy function. The IGMP snooping/proxy logic (115) stores certain information in the IGMP snooping/proxy database (111). The IGMP snooping/proxy logic (115) preferably also configures a forwarding interface list (not shown) that is used to by the switching logic (112) for forwarding packets among and between the network interfaces (113, 114) and the remote modules (stack ports) via the inter-module communication interface (116). The forwarding interface list indicates all network interfaces and all remote modules (stack ports) that are associated with the corresponding multicast stream.

The switching logic (112) forwards protocol messages among and between the network interfaces (113, 114), the remote modules (stack ports), and the IGMP snooping/proxy logic (115). Among other things, the switching logic (112) utilizes the forwarding interface list to forward multicast packets among and between the network interfaces (113, 114) and the remote modules (stack ports), and also forwards IGMP messages to the IGMP snooping/proxy logic (115).

In a preferred embodiment of the invention, each module can be configured to operate as an independent stand-alone device or in a stand-alone mode within the stack. Thus, each module includes management/control logic (not shown) that enables the module to be individually managed and controlled, for example, through a console user interface, a Simple Network Management Protocol (SNMP) session, or a world wide web session. Therefore, the preferred management/control logic includes, among other things, a Transmission Control Protocol/Internet Protocol (TCP/IP) stack, an SNMP agent, and a web engine. Furthermore, each module is assigned MAC and IP addresses, allowing each module to send and receive management and control information independently of the other modules. When operating in a cooperating mode of operation, each cooperating module uses the same MAC and IP addresses for management and control, so that the cooperating modules appear and operate as a single device having a single MAC/IP address pair. In a preferred embodiment, all cooperating modules use the MAC and IP addresses of a base module. The base module is described below.

The management/control logic maintains a number of management databases (not shown) for storing configuration and operational information. The management/control logic maintains a management database containing network management objects and parameters that are related to a particular port or interface, and maintains another management database containing network management objects and parameters that are system-wide in scope. When the module is operating in a cooperating mode within the stack, the management database containing network management objects and parameters that are system-wide in scope is referred to as the "shadowed" management database, and the management database containing network management objects and parameters that are related to a particular port or interface is referred to as the "segmented" management database.

In order for multiple modules to operate in a cooperating mode of operation, one of the modules is configured as a base module for the stack, specifically by a user-controlled toggle switch on the module. Any module can be configured as the base module. The base module is not a dedicated management module for the entire stack, and does not require any additional hardware or software. The base module is responsible for ensuring orderly stack formation, handling stack configuration changes such as module insertion and removal, and periodically verifying stack integrity. The base module configuration is used if a configuration conflict is identified during stack formation.

Prior to forming a stack or allowing a new module to join a stack, all modules exchange their configuration databases with the other modules. Management objects relating to IGMP snooping and IGMP proxy include, among other things, a robustness value and a query time. Management objects relating to VLAN include, among other things, VLAN-based static port masks. A database exchange event is used by a module to broadcast its configuration databases to all modules in the stack. Received databases are cached in a temporary buffer. The database exchange event does not alter a module's operating mode.

In case of a database exchange failure, a discard temporary database event is sent to all modules. Upon receiving the discard temporary database event, each module discards the configuration databases that are cached in the temporary buffer. The discard temporary database event does not alter a module's operating mode.

Once all modules have exchanged their configuration databases, a join stack event is used to form the stack. At this time, user-specified configuration data are synchronized, and any configuration conflicts are resolved across the stack. Also, various processes, including IGMP snooping and IGMP proxy processes, are synchronized across all modules of the stack so that the stack operates as a single device.

In order to perform multicast switching across the multiple interconnected modules, each module determines the interfaces that are associated with each multicast stream, and forwards each multicast packet over the interfaces that are associated with the corresponding multicast stream. A multicast stream corresponds to a particular multicast group, and, if VLAN is enabled, to a particular multicast group on a particular VLAN. It should be noted that a particular multicast group can be supported on multiple VLANs, even on the same interface.

When multicast switching is performed using broadcasting, all interfaces are considered to be associated with the multicast stream. Specifically, all network interfaces and all remote modules (stack ports) are considered to be associated with the multicast stream. When a multicast packet is received over a network interface, the multicast packet is forwarded to the other network interfaces, and is also forwarded to the remote modules via the inter-module communication interface. When a multicast packet is received from a remote module over the inter-module communication interface, the multicast packet is forwarded to all network interfaces.

Figure 3:
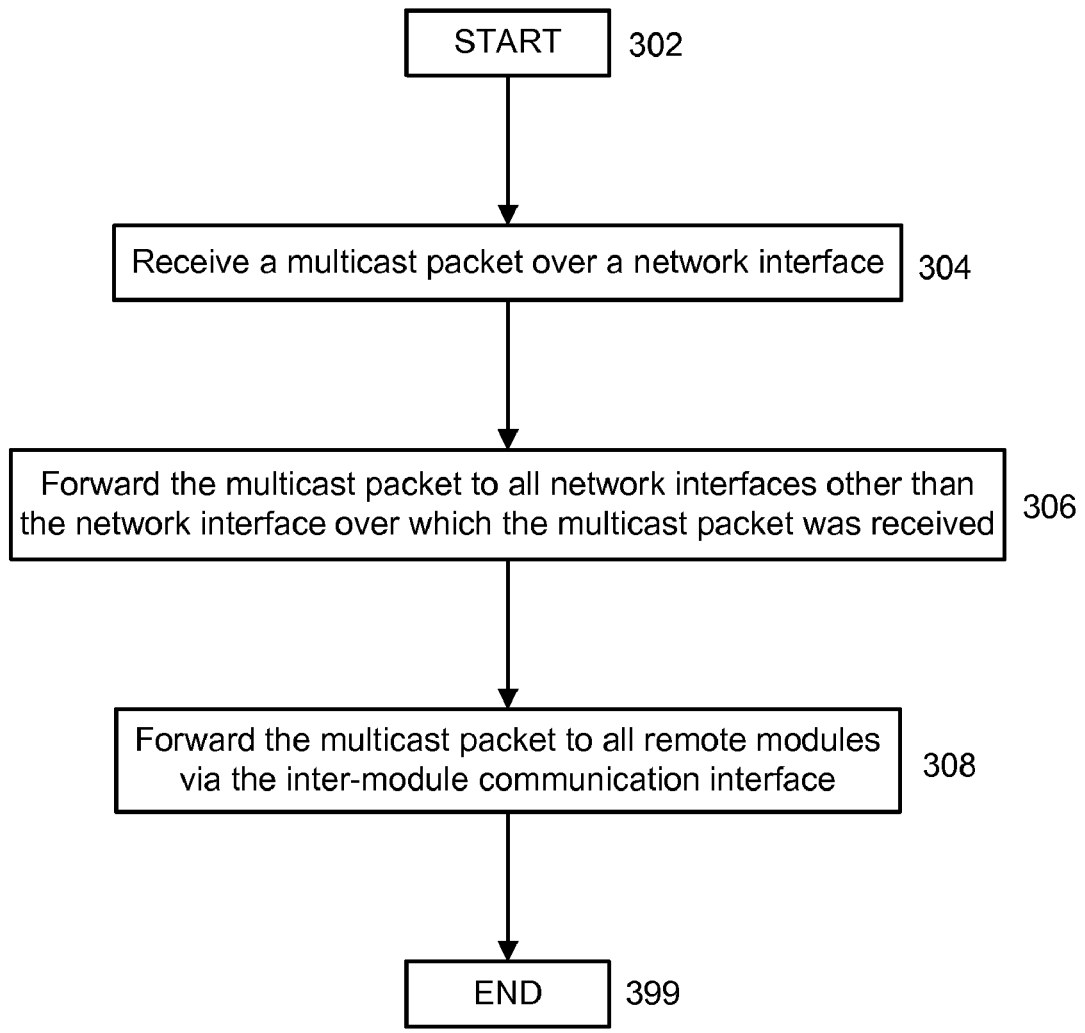
FIG. 3 is a logic flow diagram showing exemplary logic for forwarding a multicast packet received over a network port in accordance with an embodiment of the present invention.

FIG. 3 is a logic flow diagram showing exemplary logic 300 for forwarding a multicast packet received over a network interface in accordance with an embodiment of the present invention. Beginning at step 302, and upon receiving a multicast packet over a network interface, in step 304, forwards the multicast packet to all network interfaces other than the network interface over which the multicast packet was received, in step 306. The logic also forwards the multicast packet to all remote modules (stack ports) via the inter-module communication interface, in step 308. The logic 300 terminates in step 399.

Figure 4:
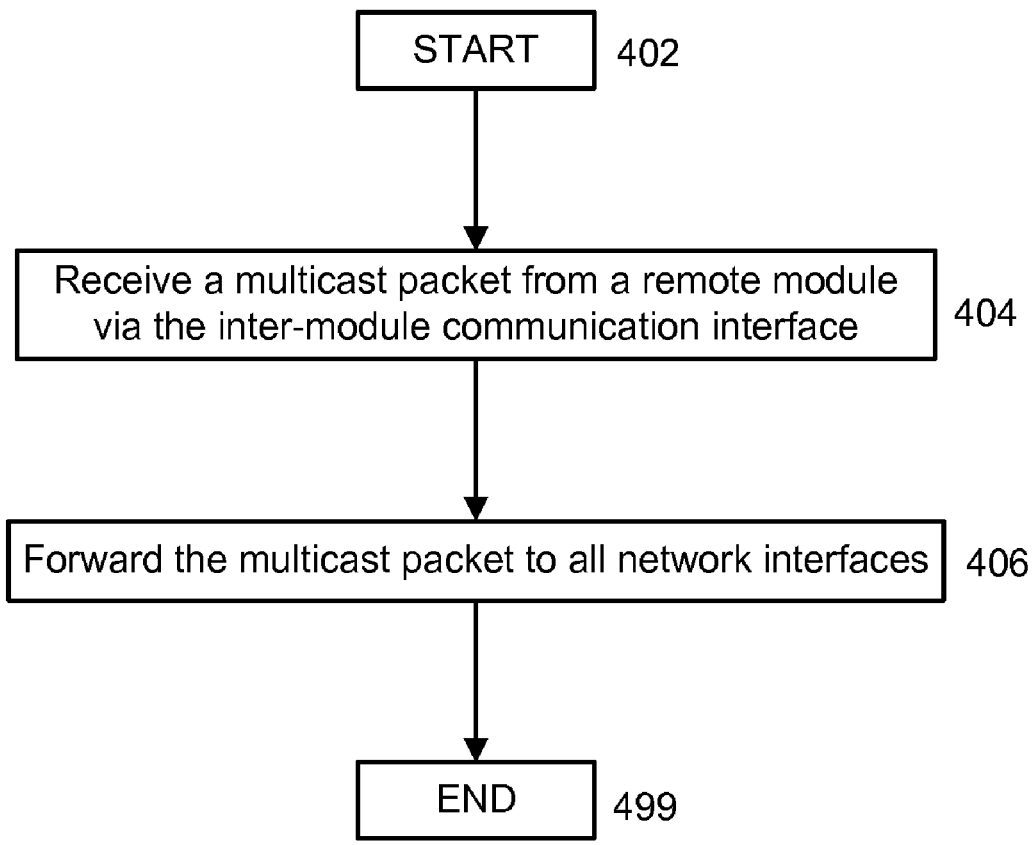
FIG. 4 is a logic flow diagram showing exemplary logic for forwarding a multicast packet received from a remote module over the inter-module communication interface in accordance with an embodiment of the present invention.

FIG. 4 is a logic flow diagram showing exemplary logic 400 for forwarding a multicast packet received from a remote module over the inter-module communication interface in accordance with an embodiment of the present invention. Beginning at step 402, and upon receiving a multicast packet from a remote module via the inter-module communication interface, in step 404, the logic forwards the multicast packet to all network interfaces, in step 406. The logic 400 terminates in step 499.

When IGMP snooping is enabled, only interfaces that support a multicast device are considered to be associated with the corresponding multicast stream. A network interface is considered to be associated with a particular multicast stream if at least one multicast device associated with the multicast stream is supported on the network interface. A remote module (stack port) is considered to be associated with a particular multicast stream if at least one multicast device associated with the multicast stream is supported on any of the network interfaces supported by the remote module. Thus, a stack port is essentially an aggregation of all network interfaces supported by the corresponding remote module.

Figure 5:
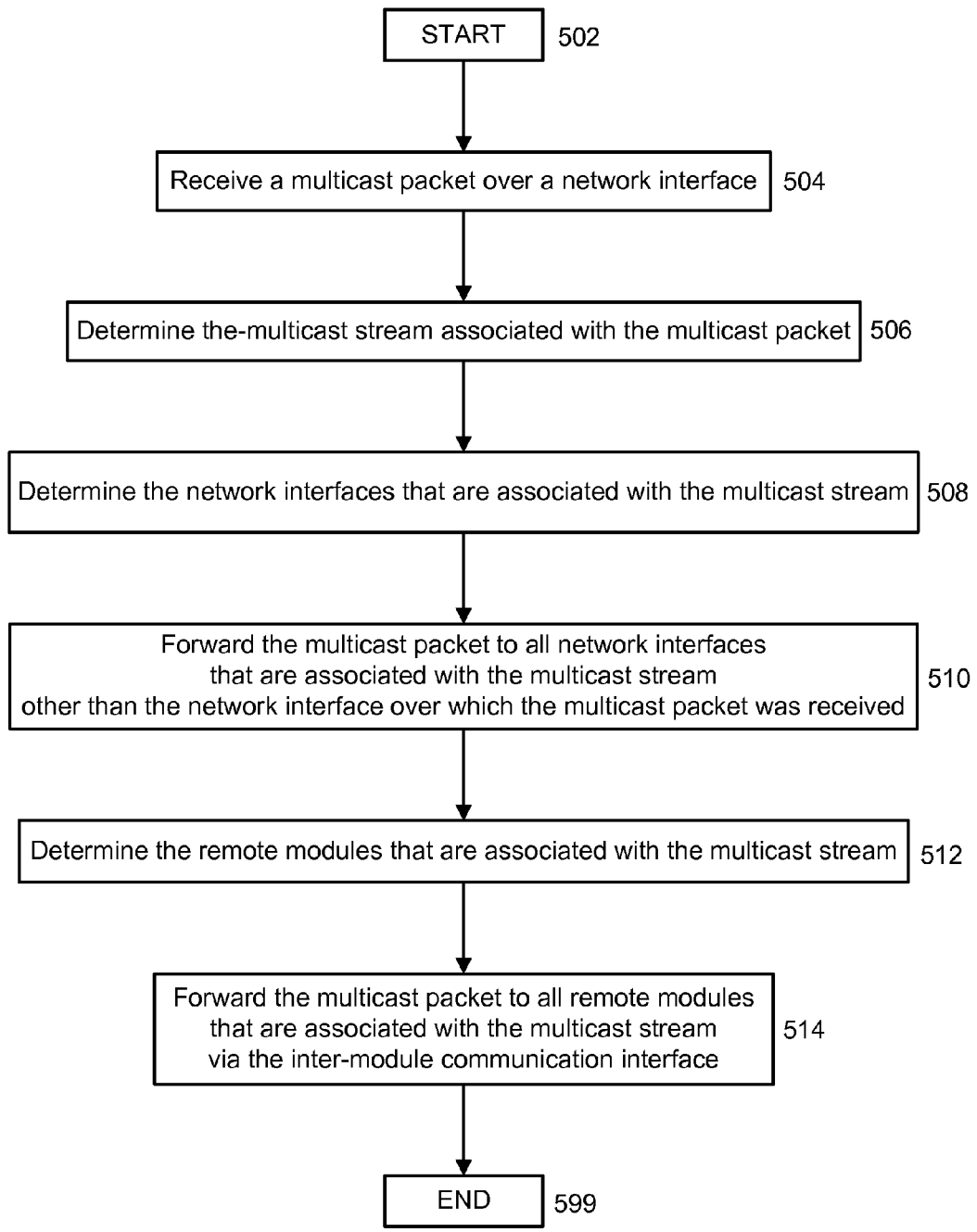
FIG. 5 is a logic flow diagram showing exemplary logic for forwarding a multicast packet received over a network port in accordance with an embodiment of the present invention.

FIG. 5 is a logic flow diagram showing exemplary logic 500 for forwarding a multicast packet received over a network port in accordance with an embodiment of the present invention. Beginning at step 502, and upon receiving a multicast packet over a network interface, in step 504, the logic proceeds to determine the multicast stream that is associated with the multicast packet, in step 506. The logic then determines the network interfaces that are associated with the multicast stream, in step 508, and forwards the multicast packet to all network interfaces that are associated with the multicast stream other than the network interface over which the multicast packet was received, in step 510. The logic also determines the remote modules (stack ports) that are associated with the multicast stream, in step 512, and forwards the multicast packet to all remote modules (stack ports) that are associated with the multicast stream via the inter-module communication interface (116), in step 514. The logic 500 terminates in step 599.

Figure 6:
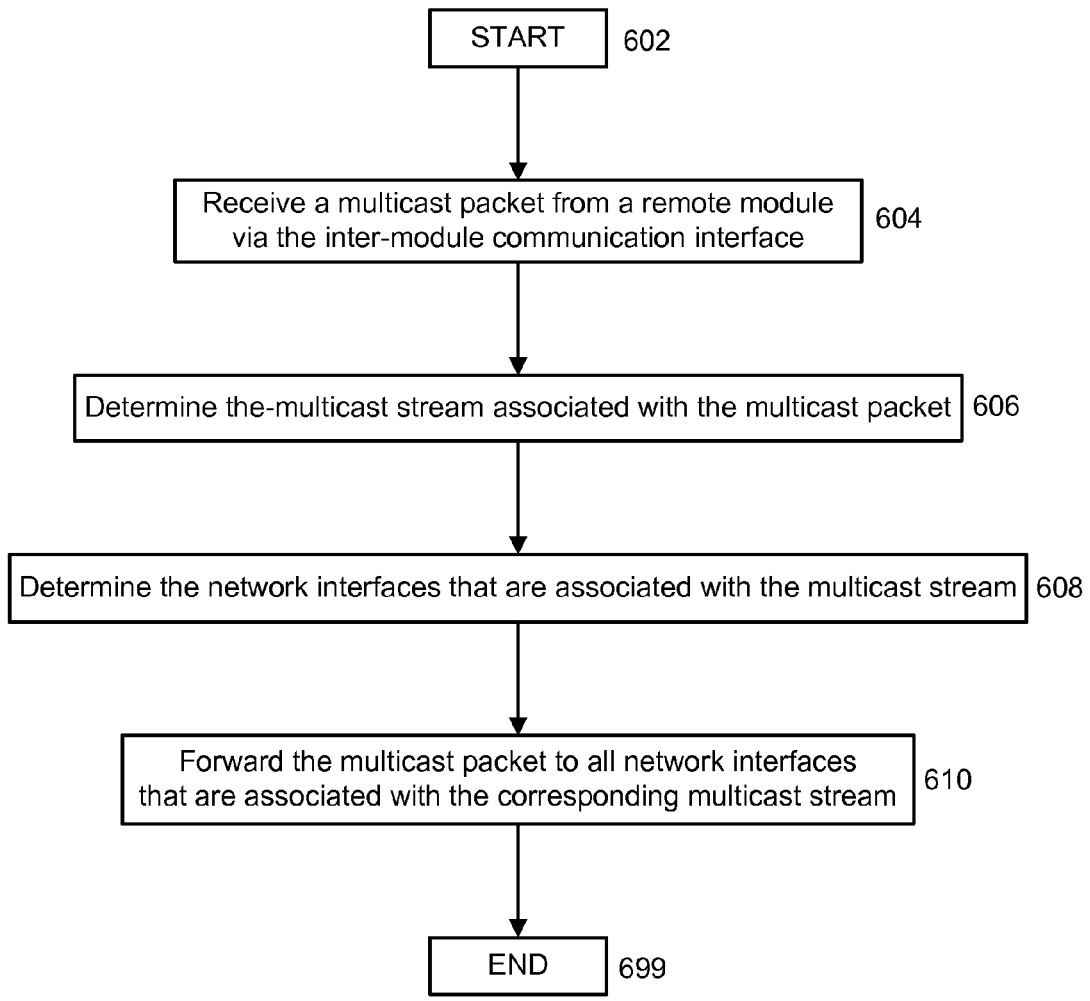
FIG. 6 is a logic flow diagram showing exemplary logic for forwarding a multicast packet received from a remote module over the inter-module communication interface in accordance with an embodiment of the present invention.

FIG. 6 is a logic flow diagram showing exemplary logic 600 for forwarding a multicast packet received from a remote module over the inter-module communication interface (116) in accordance with an embodiment of the present invention. Beginning at step 602, and upon receiving a multicast packet from a remote module over the inter-module communication interface (116), in step 604, the logic proceeds to determine the multicast stream that is associated with the multicast packet, in step 606. The logic then determines the network interfaces that are associated with the multicast stream, in step 608, and forwards the multicast packet to all network interfaces that are associated with the multicast stream, in step 610. The logic 600 terminates in step 699.

There are various ways in which to determine the interfaces that are associated with the multicast stream. For example, IGMP snooping can be used to automatically determine the interfaces based upon IGMP messages that are received over the various interfaces. Alternatively, or additionally, a network manager can configure the interfaces that are associated with the multicast stream via the management/control logic. This latter approach may be useful, for example, to configure interfaces that do not support IGMP.

IGMP snooping in a distributed (modular) communication system requires that all IGMP messages be distributed to all modules. Therefore, when a module receives an IGMP message over a network interface, the module forwards the IGMP message to all remote modules via the inter-module communication interface (116).

Each module determines the interfaces (i.e., the network interfaces and stack ports) that are associated with a particular multicast stream based upon IGMP messages received over the interfaces. In a preferred embodiment of the invention, each module maintains a forwarding interface list for each multicast stream. Each forwarding interface list indicates the interfaces that are associated with the corresponding multicast stream. The switching logic 204 utilizes the forwarding interface list(s) to forward multicast packets among and between the network interfaces and the remote modules (stack ports).

In addition to determining that a particular interface is associated with the multicast stream, the module is able to determine whether the interface supports a multicast host device and/or a multicast router. An IGMP query message received over an interface indicates that the interface supports a multicast router, since multicast routers generate IGMP query messages. An IGMP report message received over an interface indicates that the interface supports a multicast host device, since multicast host devices generated IGMP report messages. In a preferred embodiment of the invention, each module maintains a host interface list and a router interface list for each multicast stream. The host interface list indicates the network interfaces and remote modules (stack ports) that support multicast host devices associated with the corresponding multicast stream. The router interface list indicates the network interfaces and remote modules (stack ports) that support multicast routers associated with the corresponding multicast stream. An interface is considered to be associated with the multicast stream, and is therefore included in the forwarding interface list, if the interface is in either the host interface list or the router interface list.

Although a module is neither a multicast host device nor a multicast router, it is sometimes necessary or desirable for a module to generate IGMP query messages and/or IGMP report messages in order to support IGMP snooping and IGMP proxy in a distributed (modular) communication system. The module may send an IGMP query message, for example, to verify that a particular interface supports a multicast stream before forwarding multicast packets to the interface or to verify that a particular interface no longer supports a multicast stream before "pruning" the interface, specifically as part of the IGMP snooping function. The module may send an IGMP report message, for example, to report the multicast stream(s) supported by the module in response to an IGMP query message, specifically as part of the IGMP proxy function.

As with other protocol messages, the IGMP messages require a source MAC address and a source IP address. In a prior art embodiment, the module utilizes its own MAC and IP addresses for sending IGMP messages. This makes the module visible to other layer 3 devices, which is undesirable. Also, if the module supports multiple VLANs, then the module would need to support a separate MAC/IP address pair for each VLAN, which is an inefficient use of addresses.

Therefore, a preferred embodiment utilizes a host address for sending IGMP report messages, and utilizes a router address for sending IGMP query messages. The module learns host addresses and router addresses from received IGMP messages. The module maintains a last host address and a last router address for each multicast stream. The module utilizes the last host address for sending an IGMP report message, and utilizes the last router address for sending an IGMP query message. By using host and router addresses to send IGMP messages, the module remains transparent to layer 3 devices, and does not need to support a separate MAC/IP address pair for each VLAN.

When the module sends an IGMP message on a particular interface, the module must decide whether to format the IGMP message as an IGMP version 1 message or an IGMP version 2 message. In a prior art embodiment, the module may be configured to send IGMP version 1 messages or IGMP version 2 messages on the interface. This precludes the module from operating as a "plug-and-play" device, since the module requires an explicit configuration in order to operate in the communication network.

A preferred embodiment automatically determines an IGMP version for each interfaces based upon received IGMP messages. If the module receives only IGMP version 2 messages over a particular interface, then the module considers the interface to be an IGMP version 2 interface, and the module generates IGMP version 2 messages on the interface. If the module receives at least IGMP version 1 message over the interface, then the module considers the interface to be an IGMP version 1 interface, and the module generates IGMP version 1 messages on the interface. The module maintains an IGMP version indicator for each interface on each multicast stream. By determining the IGMP version based upon received IGMP messages, the module is able to operate as a "plug-and-play" device.

When the module 110 receives an IGMP query message over a network interface, such as the network interface (113), the switching logic (112) forwards the IGMP query message to all remote modules (stack ports) via the inter-module communication interface (116), and forwards the IGMP query message to all network interfaces other than the network interface over which the IGMP query message was received (such as the physical Ethernet port 114) The switching logic (112) also forwards the IGMP query message to the IGMP snooping/proxy logic (115) for local processing.

When the module 110 receives an IGMP report message over a network interface, such as the network interface (113), the switching logic (112) forwards the IGMP report message to all remote modules (stack ports) via the inter-module communication interface (116), and, if IGMP proxy is disabled, forwards the IGMP report message to all network interfaces other than the network interface over which the IGMP report message was received (such as the network interface 114). The switching logic (112) also forwards the IGMP report message to the IGMP snooping/proxy logic (115) for local processing.

When the module 110 receives an IGMP query message from a remote module over the inter-module communication interface (116), the switching logic forwards the IGMP query message to all network interfaces (113, 114). The switching logic (112) also forwards the IGMP query message to the IGMP snooping/proxy logic (115) for local processing.

When the module 110 receives an IGMP report message from a remote module over the inter-module communication interface (116), the switching logic (112) forwards the IGMP report message to all network interfaces (113, 114) only if IGMP proxy is disabled. The switching logic (112) also forwards the IGMP report message to the IGMP snooping/proxy logic (115) for local processing.

The IGMP snooping/proxy logic (115) determines, among other things, a last host address for each multicast stream, a last router address for each multicast stream, the interfaces associated with each multicast stream, and an IGMP version for each interface based upon IGMP messages forwarded to the IGMP snooping/proxy logic (115) by the switching logic (112). The IGMP snooping/proxy logic (115) determines the last router address associated with the multicast stream from an IGMP query message. The IGMP snooping/proxy logic (115) determines the last host address associated with the multicast stream from an IGMP report message. The IGMP snooping/proxy logic (115) determines an IGMP version for each interface based upon the format of IGMP messages received over the interface. The IGMP snooping/proxy logic (115) determines whether a particular network interface is associated with a particular multicast stream based upon IGMP messages received over the network interface. The IGMP snooping/proxy logic (115) determines whether a particular remote module (stack port) is associated with a particular multicast stream based upon IGMP messages received from the remote module over the inter-module communication interface (116). The IGMP snooping/proxy logic (115) stores the appropriate information in the IGMP snooping/proxy database (111).

FIG. 7 shows the relevant information that the module maintains in the IGMP snooping/proxy database (111) for each multicast stream. Specifically, for each multicast stream, the module maintains a last host address 702, a last router address 704, a host interface list 706, a router interface list 708, and an IGMP version list 710. The last host address 702 stores the last host address that the module learned for the corresponding multicast stream. The last router address 704 stores the last router address that the module learned for the corresponding multicast stream. The host interface list 706 indicates all interfaces that are associated with the multicast stream and support multicast host devices. The router interface list 708 indicates all interfaces that are associated with the multicast stream and support multicast routers. The IGMP version list 710 indicates the IGMP version for each interface. In a preferred embodiment, the host interface list 706, router interface list 708, and IGMP version list 710 are bit-mapped fields having one bit per interface, that is, one bit for each network interface and one bit for each remote module (stack port). Each bit in the host interface list 706 indicates whether the corresponding interface supports a multicast host device associated with the multicast stream. Each bit in the router interface list 708 indicates whether the corresponding interface supports a multicast router associated with the multicast stream. Each bit in the IGMP version list 710 indicates whether the corresponding interface is an IGMP version 1 interface or an IGMP version 2 interface. The IGMP snooping/proxy logic (115) uses the host interface list 706 and the router interface list 708 to configure the forwarding interface list.

Thus, upon obtaining an IGMP message from the switching logic (112), the IGMP snooping/proxy logic (115) determines the multicast stream associated with the IGMP message. If the IGMP message is an IGMP query message from a particular router, then the IGMP snooping/proxy logic (115) saves the router address as the last router address 704 associated with the multicast stream, and adds the interface to the router interface list 708 associated with the multicast stream. If the IGMP message is an IGMP report message from a particular multicast host, then the IGMP snooping/proxy logic (115) saves the host address as the last host address 702 associated with the multicast stream, and adds the interface to the host interface list 706 associated with the multicast stream. The IGMP snooping/proxy logic (115) also determines the IGMP version for the IGMP message, and indicates the IGMP version for the interface in the IGMP version list 710. In a preferred embodiment, an interface is considered to be an IGMP version 1 interface if at least one IGMP version 1 message was received over the interface, and is considered to be an IGMP version 2 interface if only IGMP version 2 messages are received over the interface.

Additionally, the IGMP snooping/proxy logic (115) configures the forwarding interface list based upon the host interface list and the router interface list. In a preferred embodiment, the forwarding interface list is a bit-mapped field having one bit per interface that is programmed into a CAM chip that is used by the switching logic (112) to forward packets. A particular interface is included in the forwarding interface list if the interface is included in the host interface list and/or the router interface list.

When the IGMP snooping/proxy logic (115) sends an IGMP query message on a particular interface; for example, as part of the IGMP snooping function, the IGMP snooping/proxy logic (115) uses the last router address associated with the multicast stream, and formats the IGMP query message according to the IGMP version indicator associated with the interface. The IGMP snooping/proxy logic (115) generates two types of IGMP query messages, specifically an "all-aboard" query and a "last member" query. The "all-aboard" query is used to determine all interfaces that are associated with a particular multicast stream when IGMP snooping is first enabled. This prevents the module from accidentally removing an interface that supports a multicast device from the forwarding interface list, which would disrupt multicast services to the multicast device. The "last member" query is used to ensure that there are no multicast devices on the interface before removing the interface from the forwarding interface list.

When the IGMP snooping/proxy logic (115) sends an IGMP report message on a particular interface, for example, as part of the IGMP proxy function, the IGMP snooping/proxy logic (115) uses the last host address associated with the multicast stream, and formats the IGMP report message according to the IGMP version indicator associated with the interface. The module may send an IGMP report message, for example, to report the multicast stream(s) supported by the module in response to an IGMP query message.

Figure 8:
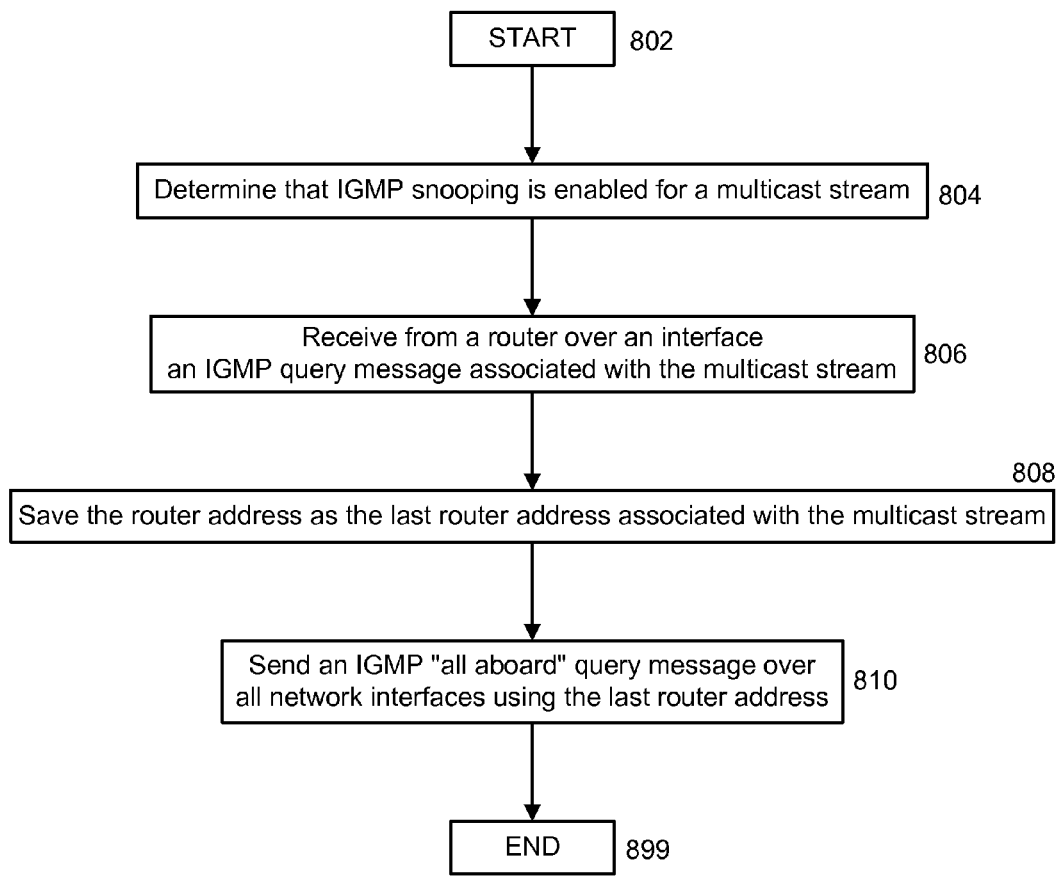
FIG. 8 is a logic flow diagram showing exemplary logic for enabling IGMP snooping in accordance with a preferred embodiment of the present invention.

FIG. 8 is a logic flow diagram showing exemplary logic 800 for enabling IGMP snooping in accordance with a preferred embodiment of the present invention. Beginning at step 802, and upon determining that IGMP snooping is enabled for a particular multicast stream, in step 804, the logic waits for at least one IGMP query message associated with the multicast stream. Upon receiving an IGMP query message associated with the multicast stream from a router over an interface, in step 806, the logic saves the router address as the last router address associated with the multicast stream, in step 808, and sends an IGMP "all aboard" query message over all network interfaces using the last router address, in step 810. The logic 800 terminates in step 899.

Figure 9:
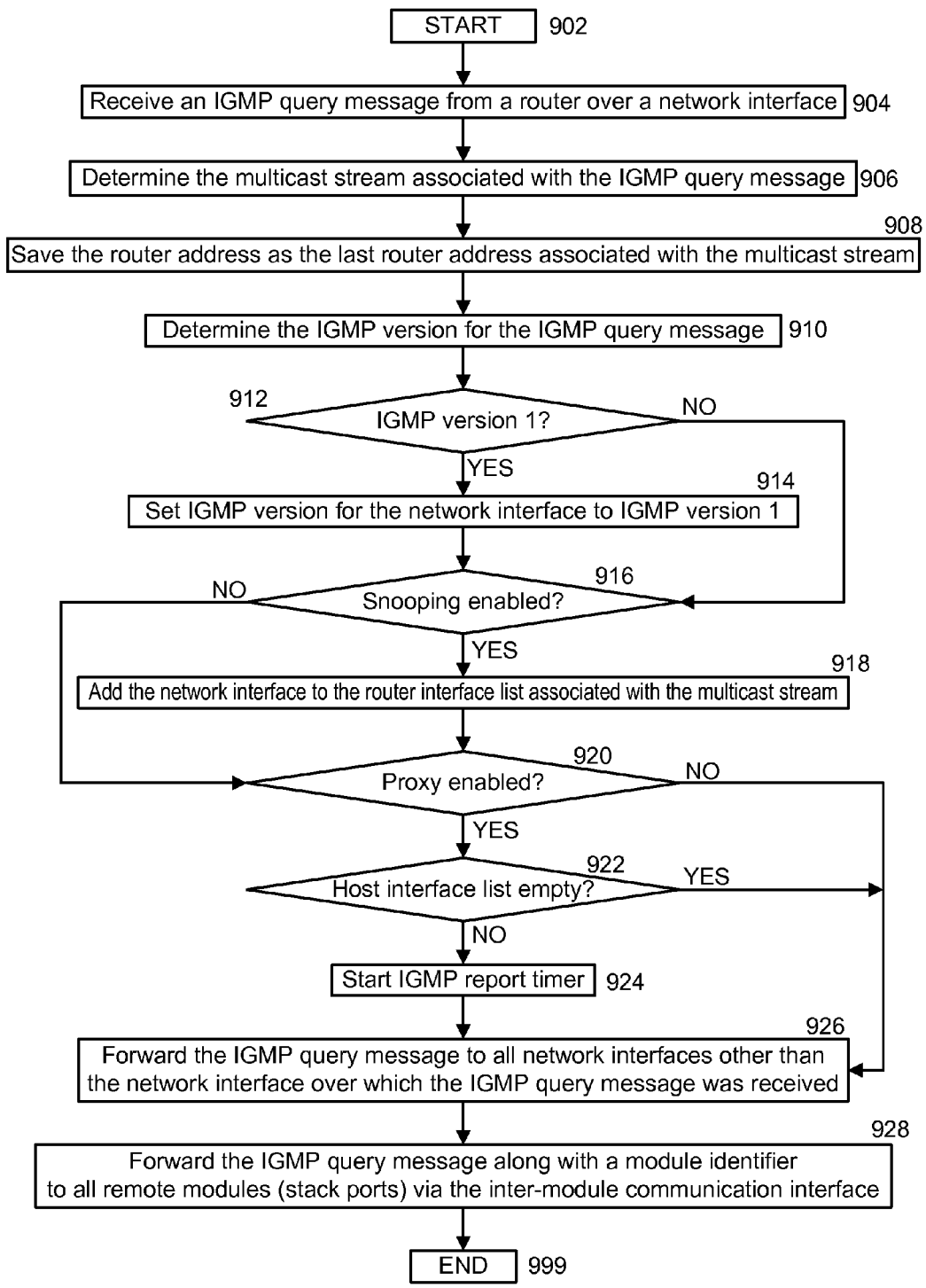
FIG. 9 is a logic flow diagram showing exemplary logic for processing an IGMP query message received over a network interface in accordance with a preferred embodiment of the present invention.

FIG. 9 is a logic flow diagram showing exemplary logic 900 for processing an IGMP query message received over a network interface in accordance with a preferred embodiment of the present invention. Beginning at step 902, and upon receiving an IGMP query message from a router over a network interface, in step 904, the logic determines the multicast stream associated with the IGMP query message, in step 906, and saves the router address as the last router address associated with the multicast stream, in step 908. The logic then determines the IGMP version for the IGMP query message, in step 910, and, if the IGMP query message is an IGMP version 1 message (YES in step 912), the logic sets the IGMP version for the network interface to IGMP version 1, in step 914. If IGMP snooping is enabled (YES in step 916), then the logic adds the network interface to the router interface list associated with the multicast stream, in step 918. If IGMP proxy is enabled (YES in step 920) and the host interface list is not empty (NO in step 922), then the logic starts an IGMP report timer, in step 924. In any case, the logic forwards the IGMP query message to all network interfaces other than the network interface over which the IGMP query message was received, in step 926, and forwards the IGMP query message along with a module identifier to all remote modules (stack ports) via the inter-module communication interface, in step 928. The logic 900 terminates in step 999.

Figure 10:
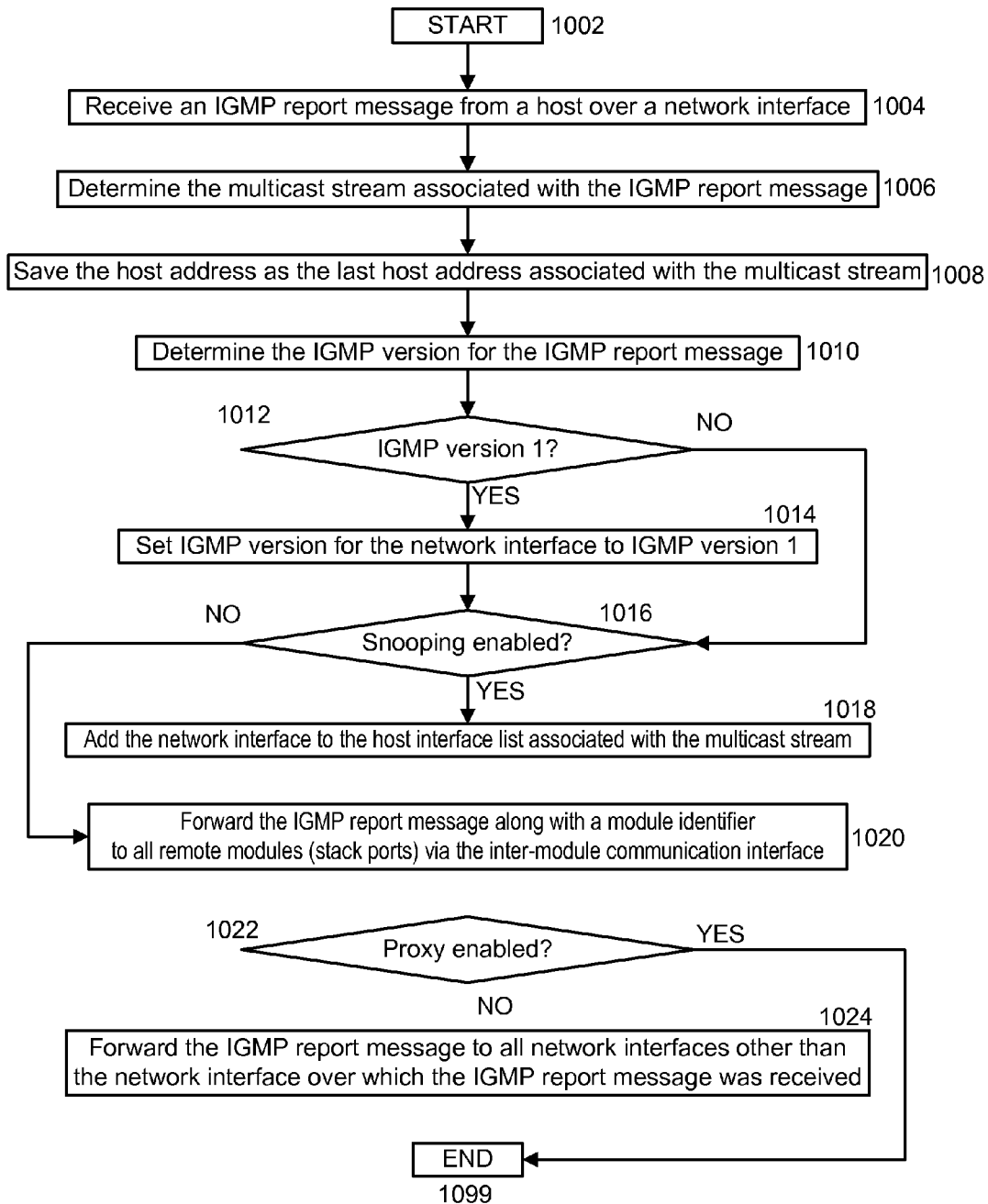
FIG. 10 is a logic flow diagram showing exemplary logic for processing an IGMP report message received over a network interface in accordance with a preferred embodiment of the present invention.

FIG. 10 is a logic flow diagram showing exemplary logic 1000 for processing an IGMP report message received over a network interface in accordance with a preferred embodiment of the present invention. Beginning at step 1002, and upon receiving an IGMP report message from a host over a network interface in step 1004, the logic determines the multicast stream associated with the IGMP report message, in step 1006, and saves the host address as the last host address associated with the multicast stream, in step 1008. The logic then determines the IGMP version for the IGMP report message, in step 1010, and, if the IGMP report message is an IGMP version 1 message (YES in step 1012), the logic sets the IGMP version for the network interface to IGMP Version 1, in step 1014. If IGMP snooping is enabled (YES in step 1016), then the logic adds the network interface to the host interface list associated with the multicast stream, in step 1018. The logic forwards the IGMP report message along with a module identifier to all remote modules (stack ports) via the inter-module communication interface, in step 1020. If IGMP proxy is disabled (NO in step 1022), then the logic forwards the IGMP report message to all network interfaces other than the network interface over which the IGMP report message was received, in step 1024. The logic 1000 terminates in step 1099.

Figure 11:
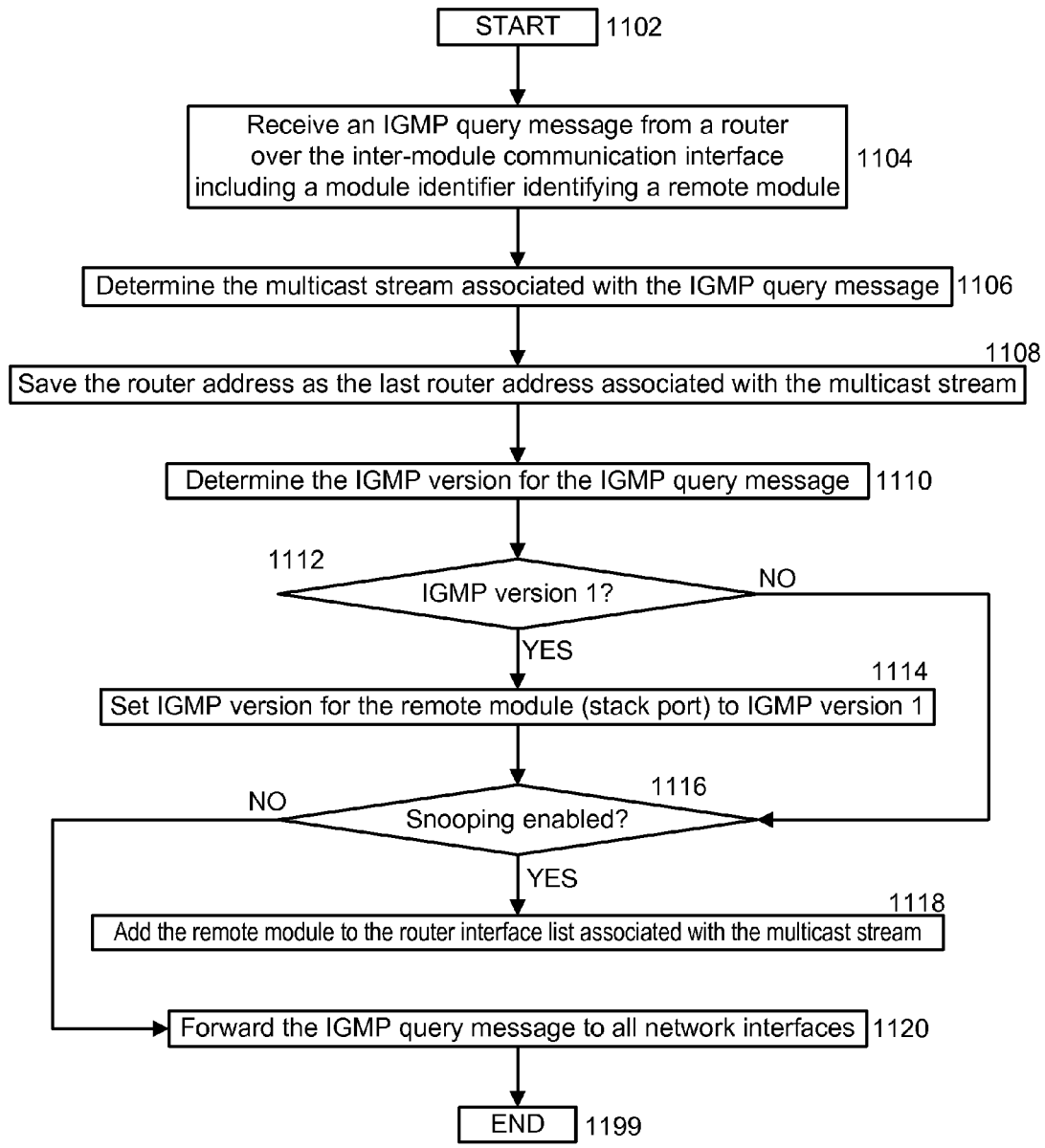
FIG. 11 is a logic flow diagram showing exemplary logic for processing an IGMP query message received from a remote module in accordance with a preferred embodiment of the present invention.

FIG. 11 is a logic flow diagram showing exemplary logic 1100 for processing an IGMP query message received from a remote module in accordance with a preferred embodiment of the present invention. Beginning at step 1102, and upon receiving an IGMP query message from a router over the inter-module communication interface including a module identifier identifying a remote module, in step 1104, the logic determines the multicast stream associated with the IGMP query message, in step 1106, and saves the router address as the last router address associated with the multicast stream, in step 1108. The logic then determines the IGMP version for the IGMP query message, in step 1110, and, if the IGMP query message is an IGMP version 1 message (YES in step 1112), the logic sets the IGMP version for the remote module (stack port) to IGMP version 1, in step 1114. If IGMP snooping is enabled (YES in step 1116), then the logic adds the remote module (stack port) to the router interface list associated with the multicast stream, in step 1118. In any case, the logic forwards the IGMP query message to all network interfaces, in step 1120. The logic 1100 terminates in step 1199.

Figure 12:
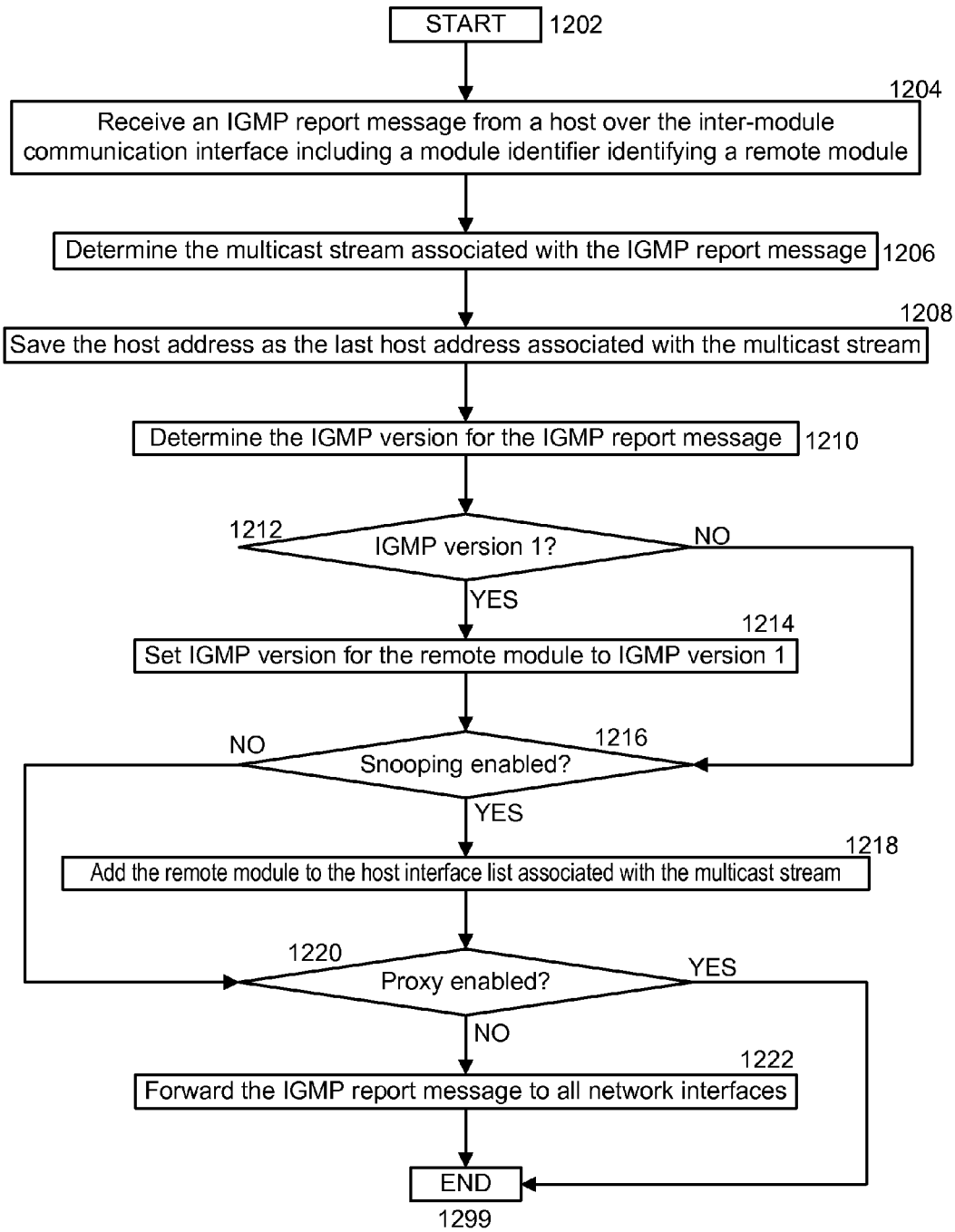
FIG. 12 is a logic flow diagram showing exemplary logic for processing an IGMP report message received from a remote module in accordance with a preferred embodiment of the present invention.

FIG. 12 is a logic flow diagram showing exemplary logic 1200 for processing an IGMP report message received from a remote module in accordance with a preferred embodiment of the present invention. Beginning at step 1202, and upon receiving an IGMP report message from a host over the inter-module communication interface including a module identifier-identifying a remote module, in step 1204, the logic determines the multicast stream associated with the IGMP report message, in step 1206, and saves the host address as the last host address associated with the multicast stream, in step 1208. The logic then determines the IGMP version for the IGMP report message, in step 1210, and, if the IGMP report message is an IGMP version 1 message YES in step 1212), the logic sets the IGMP version for the remote module (stack port) to IGMP version 1, in step 1214. If IGMP snooping is enabled (YES in step 1216), then the logic adds the remote module (stack port) to the host interface list associated with the multicast stream, in step 1218. If IGMP proxy is disabled (NQ in step 1220), then the logic forwards the IGMP report message to all network interfaces, in step 1222. The logic 1200 terminates in step 1299.

Figure 13:
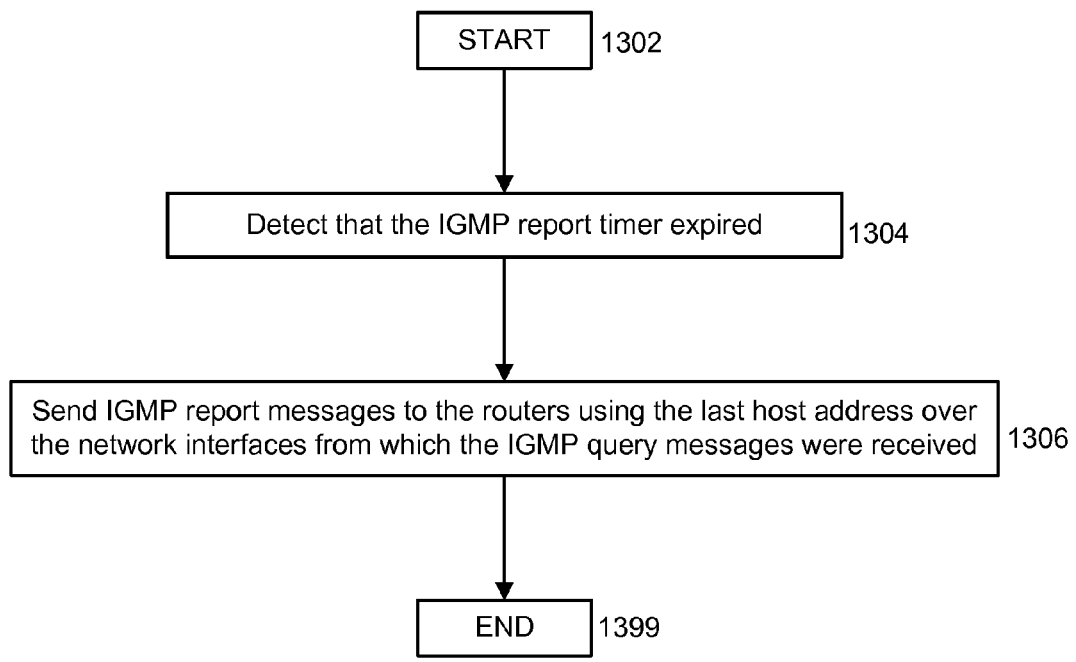
FIG. 13 is a logic flow diagram showing exemplary logic for sending an IGMP report message as part of the IGMP proxy function in accordance with a preferred embodiment of the present invention.

FIG. 13 is a logic flow diagram showing exemplary logic 1300 for sending an IGMP report message as part of the IGMP proxy function in accordance with a preferred embodiment of the present invention. Beginning at step 1302, and upon detecting that the IGMP report timer expired, in step 1304, the logic sends IGMP report messages to the routers using the last host address, in step 1306, specifically by sending the IGMP report messages over the network interfaces from which the IGMP query messages were received. The logic 1300 terminates in step 1399.

Figure 14:
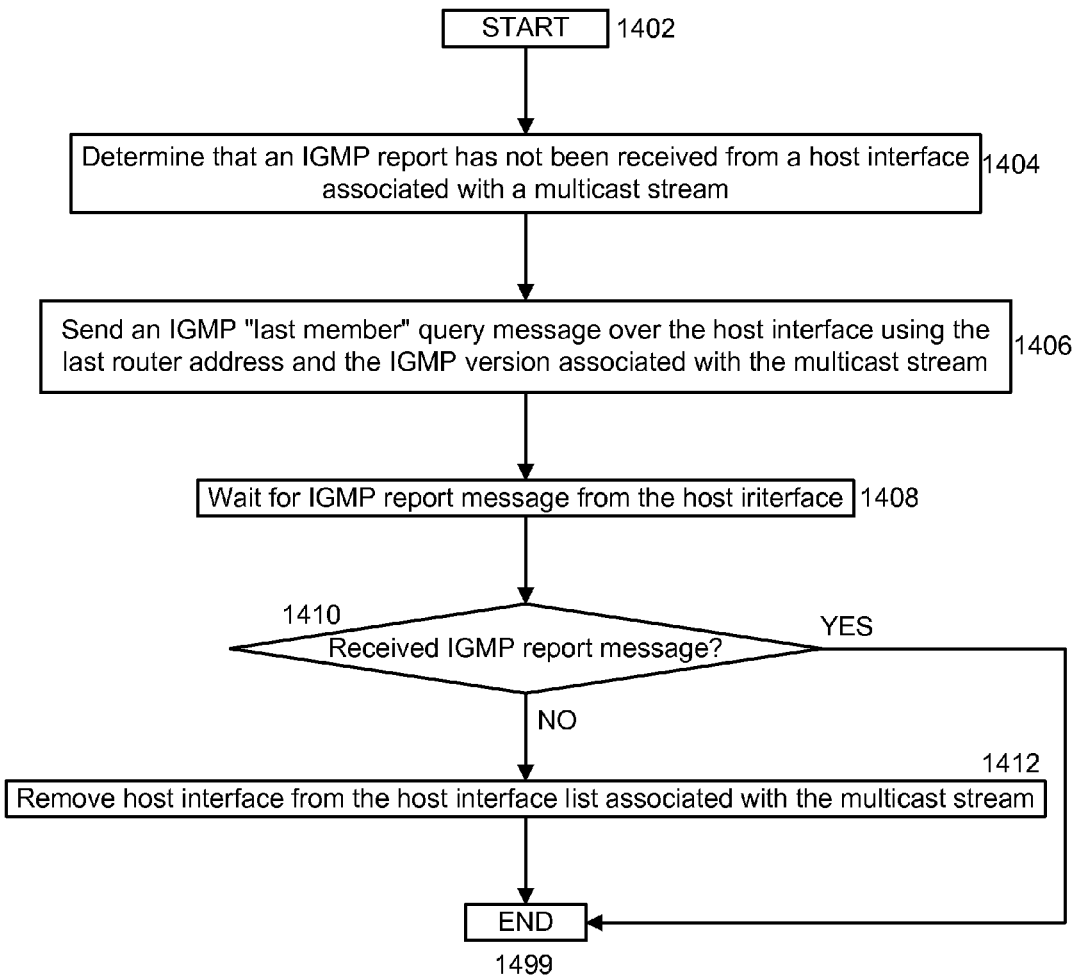
FIG. 14 is a logic flow diagram showing exemplary logic for sending an IGMP query message in accordance with a preferred embodiment of the present invention.

FIG. 14 is a logic flow diagram showing exemplary logic 1400 for sending an IGMP query message in accordance with a preferred embodiment of the present invention. Beginning at step 1402, and upon determining that an IGMP report message has not been received from a host interface associated with a multicast stream, in step 1404, the logic sends an IGMP "last member" query message over the host interface using the last host address and the IGMP version associated with the multicast stream, in step 1406. The logic then waits for an IGMP report message from the host interface, in step 1408. If the logic receives an IGMP report message over the host interface (YES in step 1410), then the logic leaves the host interface on the host interface list. If the logic does not receive an IGMP report message over the host interface (NO in step 1410), then the logic removes the host interface from the host interface list associated with the multicast stream, in step 1412. The logic 1400 terminates in step 1499.

Figure 15:
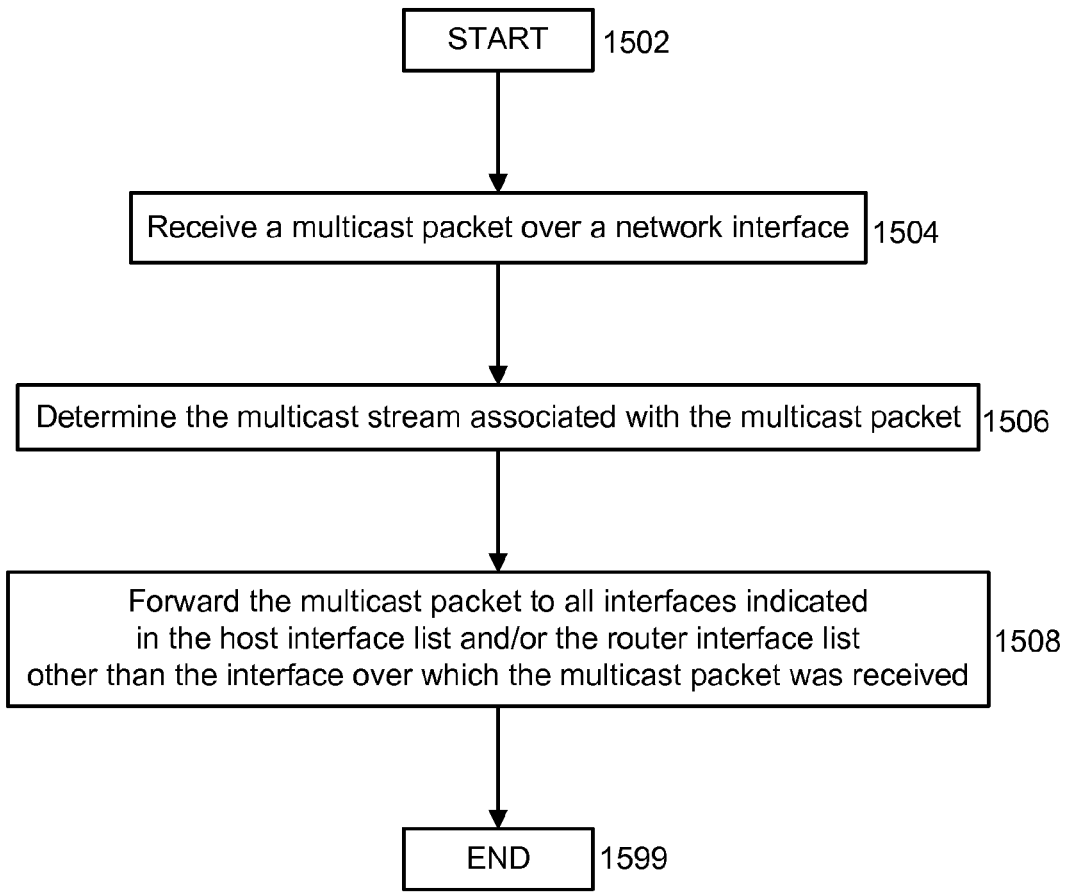
FIG. 15 is a logic flow diagram showing exemplary logic for forwarding a multicast packet in accordance with a preferred embodiment of the present invention.

FIG. 15 is a logic flow diagram showing exemplary logic 1500 for forwarding a multicast packet in accordance with a preferred embodiment of the present invention. Beginning at step 1502, and upon receiving a multicast packet over an interface, in step 1504, the logic determines the multicast stream associated with the multicast packet, in step 1506, and forwards the multicast packet to all interfaces indicated in the host interface list and/or the router interface list other than the interface over which the multicast packet was received, in step 1508. The logic 1500 terminates in step 1599.

When a cooperating module is reconfigured to operate in a stand-alone mode of operation or otherwise becomes inactive in the stack, all remaining modules must stop forwarding information to the reconfigured module, and the reconfigured module must stop forwarding information to the remaining modules. Therefore, a leave stack event is generated within the reconfigured module, and a module inactive event including a module identifier identifying the reconfigured module is sent to the remaining modules. The leave stack event causes the reconfigured module, and in particular the IGMP snooping/proxy logic (115), to remove all remote modules (stack ports) from all host interface lists and from all router interface lists, and consequently from the forwarding interface list. Upon receiving the module inactive event, each remaining module, and in particular the IGMP snooping/proxy logic (115), removes the reconfigured module (stack port) from all host interface lists and from all router interface lists, and consequently removes the reconfigured module (stack port) from the forwarding interface list (111).

Figure 16:
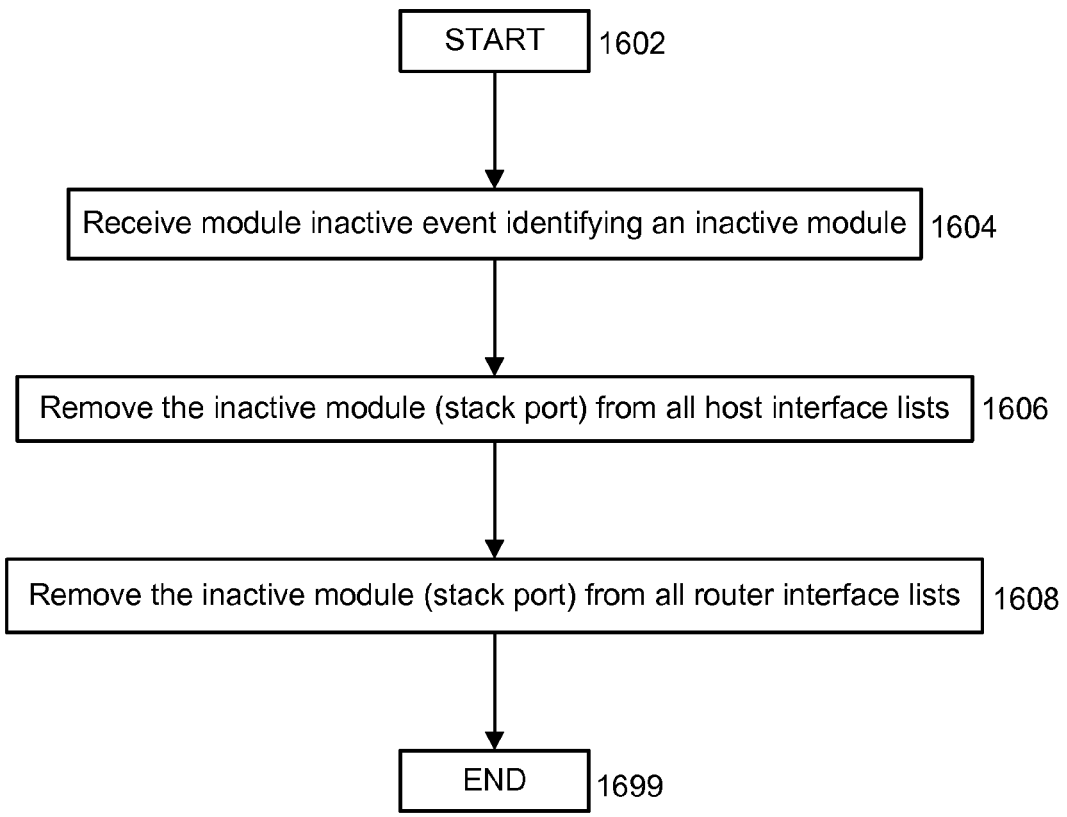
FIG. 16 is a logic flow diagram showing exemplary logic for removing an inactive remote module in accordance with a invention.

FIG. 16 is a logic flow diagram showing exemplary logic 1600 for removing an inactive remote module in accordance with a preferred embodiment of the present invention. Beginning at step 1602, and upon receiving a module inactive event identifying an inactive remote module, in step 1604, the logic removes the inactive remote module (stack port) from all host interface lists, in step 1606, and removes the inactive remote module (stack port) from all router interface lists, in step 1608. The logic 1600 terminates in step 1699.

Figure 17:
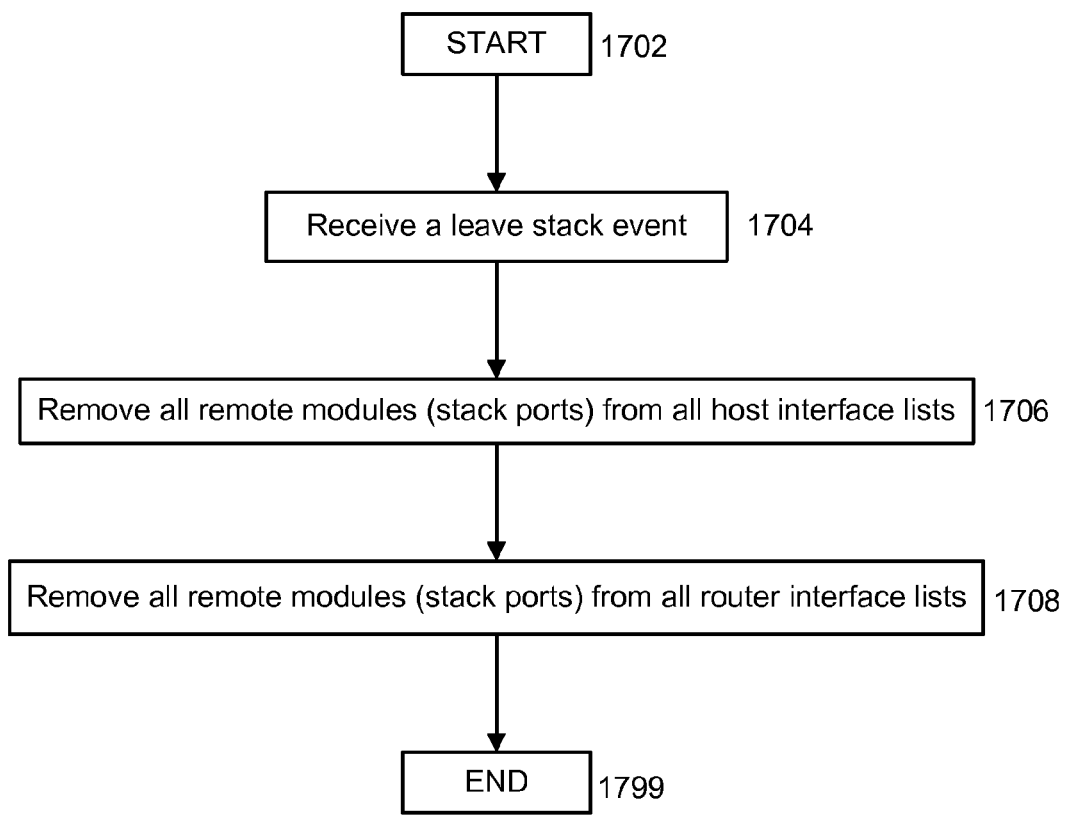
FIG. 17 is a logic flow diagram showing exemplary logic for entering a stand-alone mode of operation in accordance with a preferred embodiment of the present invention.

FIG. 17 is a logic flow diagram showing exemplary logic 1700 for entering a stand-alone mode of operation in accordance with a preferred embodiment of the present invention. Beginning at step 1702, and upon receiving a leave stack event, in step 1704, the logic removes all remote modules (stack ports) from all host interface lists, in step 1706, and removes all remote modules (stack ports) from all router interface lists, in step 1708. The logic 1700 terminates in step 1799.

In a preferred embodiment of the present invention, the intermediate device is a modular Ethernet switching device having a plurality of cooperating Ethernet switching modules. However, the present invention is in no way limited to a modular Ethernet switching device. The present invention may be applied more generally in a distributed communication system having a plurality of cooperating modules that are interconnected, for example, via a bus, backplane, or other signaling medium.

In a preferred embodiment of the present invention, predominantly all of the IGMP snooping/proxy logic is implemented as a set of computer program instructions that are stored in a computer readable medium and executed by an embedded microprocessor system within the module. Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

The present invention may be embodied in other specific forms without departing from the essence or essential characteristics. The described embodiments are to be considered in all respects only as illustrative and not restrictive.

I claim:

1. A method for forwarding multicast packets by a layer 2 module in a data switching device having a plurality of cooperating layer 2 modules, each module including at least one network interface for supporting directly connected multicast devices and an inter-module communication interface for communicating with remote modules, the method comprising:

receiving, from a layer 2 module, one or more Internet Group Management Protocol (IGMP) messages at one or more of the network interfaces, the IGMP messages being layer 3 protocol messages;

forwarding the one or more received IGMP messages to each remote module via the inter-module communication interface;

snooping received IGMP messages at each module to determine that one or more network interfaces are associated with a particular multicast stream and maintaining the associated network interfaces in a forwarding interface list for the multicast stream, the forwarding interface list indicating all network interfaces and all remote modules that are associated with the multicast stream;

receiving a multicast packet associated with the multicast stream from a network interface; and forwarding the multicast packet over the inter-module communication interface to each remote module having a network interface identified in the forwarding interface list.

2. The method of claim 1, further comprising:

determining that the multicast stream is supported on at least one network interface of one of the remote modules; and adding the remote module to the forwarding interface list upon determining that the multicast stream is supported on at least one network interface of the remote modules.

3. The method of claim 2, further comprising:

determining that the remote module is not a cooperating module; and removing the remote module from the forwarding interface list.

4. The method of claim 2, further comprising:

reconfiguring the module to operate in a stand-alone mode of operation; and removing all remote modules from the forwarding interface list.

5. A forwarding multicast device for forwarding multicast packets in a communication system having a plurality of cooperating layer 2 modules, the forwarding multicast device comprising:
- at least one network interface for supporting directly connected multicast devices;
- an inter-module communication interface for communicating with remote modules; and
- switching logic operably coupled to receive a first multicast packet from a network interface, determine a first multicast stream for the first multicast packet, and forward the first multicast packet to all remote modules that are associated with the first multicast stream over the inter-module communication interface;
- snooping logic operably coupled to determine remote modules that are associated with the first multicast stream based upon IGMP messages received from the remote modules, the IGMP messages being layer 3 protocol messages;
- a forwarding interface list indicating all remote modules and all network interfaces that are associated with the first multicast stream; and
- wherein the switching logic is operably coupled to forward the first multicast packet to all remote modules that are indicated in the forwarding interface list.

6. The forwarding multicast device of claim 5, wherein the switching logic is operably coupled to receive a second multicast packet from a remote module over the inter-module communication interface, determine a second multicast stream for the multicast packet, and forward the second multicast packet to all network interfaces that are associated with the second multicast stream.

7. The forwarding multicast device of claim 6, further comprising a forwarding interface list indicating all network interfaces that are associated with the second multicast stream.

8. The forwarding multicast device of claim 7, wherein the switching logic is operably coupled to forward the second multicast packet to all network interfaces that are indicated in the forwarding interface list.

9. The forwarding multicast device of claim 6, wherein the snooping logic is operably coupled to determine network interfaces that are associated with the second multicast stream based upon IGMP messages received from the network interfaces.

10. The forwarding multicast device of claim 9, wherein the snooping logic is operably coupled to receive an IGMP message from a network interface and add the network interface to a forwarding interface list.

11. A non-transitory computer program product comprising a computer readable medium having embodied therein a computer program for forwarding multicast packets by a layer 2 module in a communication system having a plurality of cooperating layer 2 modules, the module including at least one network interface for supporting directly connected multicast devices and an inter-module communication interface for communicating with remote modules, such that the computer program, when carried out by a processing device, causes the processing device to perform the operations of:
- receiving logic programmed to receive an IGMP message from a remote module over the inter-module communication interface, the IGMP message being layer 3 protocol message;
- snooping logic programmed to determine that the remote module supports a multicast stream based upon the IGMP message received from the remote module, wherein the snooping logic is programmed to add the remote module to a forwarding interface list that indicates all network interfaces and remote modules associated with the multicast stream; and
- switching logic programmed to receive multicast packets associated with the multicast stream from a network interface and forward the multicast packets to the remote module over the inter-module communication interface.

12. The method of claim 1 wherein the forwarding interface list indicates all remote modules that are associated with a first multicast stream and indicates all remote modules that are associated with a second multicast stream.

* * * * *